United States Patent [19]

Thomson et al.

[11] Patent Number: 4,644,014

[45] Date of Patent: Feb. 17, 1987

[54] FOAMED INSULATION AND PROCESS FOR PRODUCING THE SAME

[76] Inventors: Donald W. Thomson, 1215 Lakeview Dr., Inverness, Fla. 32650; R. Keene Christopher, 2705 VanBuren St., Weedsport, N.Y. 13166

[21] Appl. No.: 604,645

[22] PCT Filed: Aug. 29, 1983

[86] PCT No.: PCT/US83/01335

§ 371 Date: Apr. 26, 1984

§ 102(e) Date: Apr. 26, 1984

[87] PCT Pub. No.: WO84/00921

PCT Pub. Date: Mar. 15, 1984

Related U.S. Application Data

[63] Continuation-in-part of Ser. No. 414,953, Sep. 3, 1982, abandoned.

[51] Int. Cl.$^4$ .............................. C08J 9/30; C08J 9/32; B29C 39/10; E04B 2/34
[52] U.S. Cl. ..................................... 521/68; 52/309.11; 52/743; 118/24; 118/303; 264/31; 264/46.4; 264/46.5; 264/123; 264/DIG. 7; 422/133; 425/817 R; 521/54; 521/55; 521/136; 521/139; 521/141; 523/218; 523/219
[58] Field of Search .......... 264/46.5, 31, 121, DIG. 6, 264/DIG. 7, 50, 45.3, 46.4, 123; 52/309.11, 743; 118/24, 303; 422/133; 425/817 R; 521/68, 54, 55, 136, 139, 141; 523/218, 219

[56] References Cited

U.S. PATENT DOCUMENTS

| Re. 25,564 | 4/1964 | Alford et al. ................. | 264/DIG. 6 |
| 2,806,509 | 9/1957 | Bozzacco et al. ............ | 264/DIG. 6 |
| 3,957,501 | 5/1976 | Matsuda et al. ............. | 264/DIG. 6 |
| 4,272,935 | 6/1981 | Lukas et al. .................... | 264/31 X |

*Primary Examiner*—Philip Anderson
*Attorney, Agent, or Firm*—Parkhurst & Oliff

[57] ABSTRACT

An insulating foam and a process for producing insulating foam, wherein a foamable first component may be made of alkyl sulfate, half ester of maleic anhydride and acrylic resin in an aqueous solution is mechanically foamed with air, and to that foam is added an aqueous solution of magnesium oxide, dispersant, acrylic resin, perlite and/or precipitated calcium carbonate. To those components is added an aqueous solution of at least one of aluminum chloride, magnesium sulfate, magnesium chloride, zinc chloride, sulfamic acid, sodium silicate, zinc oxide, barium metaborate, vinyl alcohol, magnesium carbonate, calcium chloride and vinyl acetate. In another embodiment a polyvinyl alcohol and dispersant first portion is foamed with air and mixed with a second cementitious portion comprising magnesium oxide and barium metaborate. Such two or three portion compositions can be mixed in the mixing chamber of a foaming gun which immediately after foam-mixing injects the foamed mixture into a desired site, such as a building wall.

27 Claims, 4 Drawing Figures

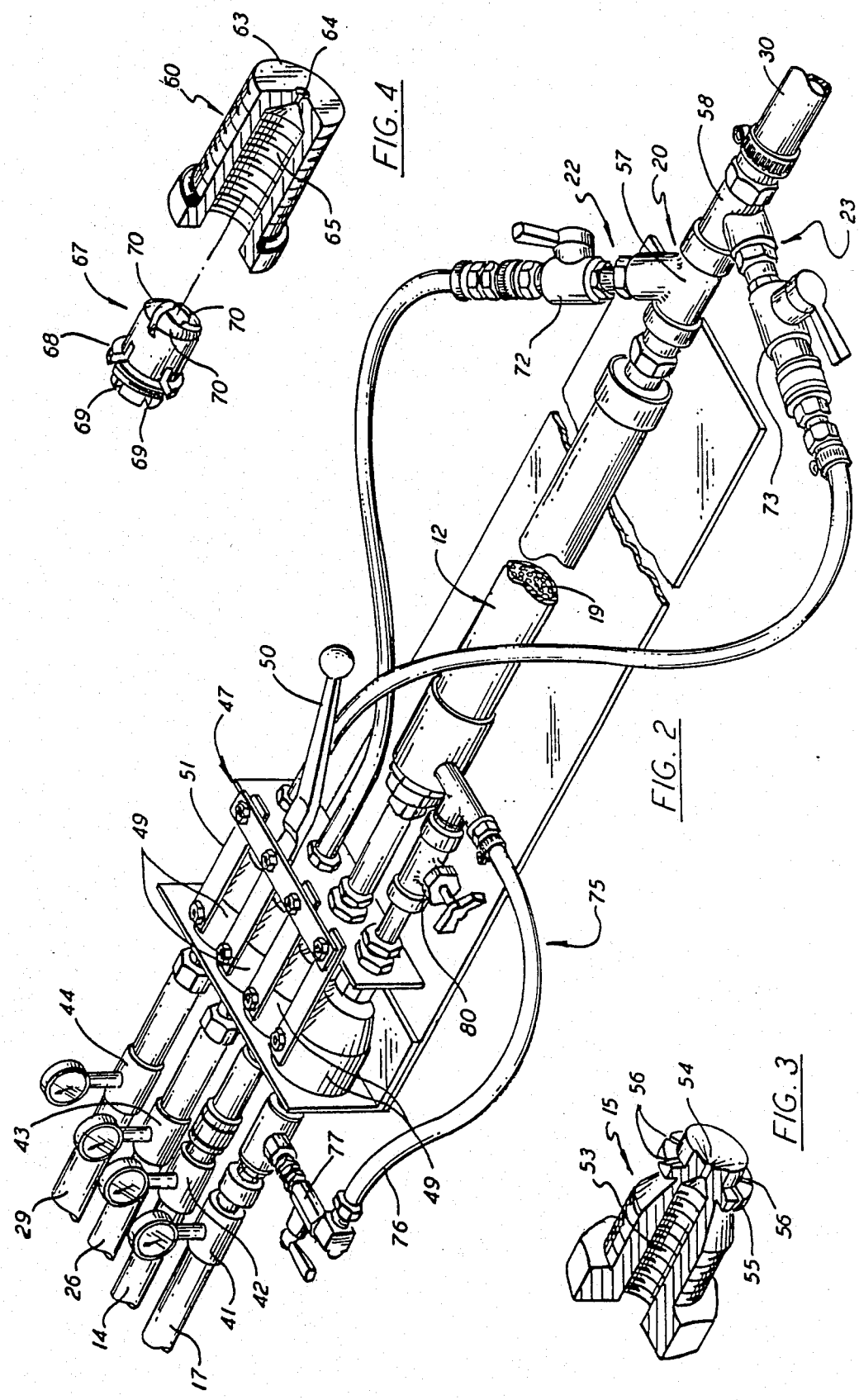

FOAMED INSULATION AND PROCESS FOR PRODUCING THE SAME

CROSS-REFERENCE TO RELATED APPLICATION

This application is a continuation-in-part of our prior pending application Ser. No. 414,953, filed Sept. 3, 1982, now abandoned.

BACKGROUND OF THE INVENTION

1. Field of the Invention

The present invention relates to foams which are useful for insulating cavities and structures, such as spaces between walls in houses. The inventive foam compositions are typically prepared in three separate portions, namely (A) cement, (B) foam, (C) catalyst or hardener. More particularly, in some embodiments the present invention is directed to an insulating foam, which is produced by mechanically mixing and foaming a first alkyl sulfate component, adding a second magnesium oxide component to the first component, and adding a third component which is an aqueous solution of at least one of aluminum chloride, magnesium sulfate, magnesium chloride, zinc chloride, sulfamic acid, sulfonic acid, citric acid, resorcinol, sodium silicate, zinc oxide, barium metaborate, vinyl alcohol, magnesium carbonate, calcium chloride and vinyl acetate. A sodium salt of carboxylate polyelectrolyte, for example, that known as Tamol 731, a Registered Trademark of Rohm and Haas, can be used instead of the alkyl sulfate. In other embodiments, two basic components may be used. In all embodiments air is added initially to foam one of the components or a mixture of components. The present application is also related to application Ser. No. 412,371, filed Aug. 27, 1983 and now abandoned.

2. Description of the Prior Art

In the past, it has been known to use an ureaformaldehyde foam for insulating cavities and structures. However, use of this foam has been prohibited because of alleged health hazards to occupants of structures in which this foam has been used.

It has also been known to use a reaction of magnesium oxide with magnesium chloride or magnesium sulfate to produce an oxychloride or oxysulfate cement.

SUMMARY OF THE INVENTION

It is an object of this invention to provide a foam which can be used for insulating structures.

It is another object of this invention to provide a foam-cement mixture wherein the foam maintains sufficient integrity to maintain its shape and volume until the inter-mixed cement sets or hardens to fix the composition in place.

It is a further object to provide a foam which is made from materials which are not irritating to occupants of structures in which the foam is used.

It is a still further object of this invention to provide a process for making the foam discussed in the previous two objects.

It is a still further object of this invention to provide a foam and a process for making a foam which can be easily used to install the foam in a structure.

The above objects and others are obtained by providing a foam which is made by combining two or three separate component mixtures. In a first embodiment, the first component is an aqueous solution of an alkyl sulfate, styrene maleic anhydride resin and an acrylic resin, which is mechanically foamed. A sodium salt of a carboxylate polyelectrolyte may be used instead of the alkyl sulfate. Maleic anhydride resin may or may not be used with the polyelectrolyte. To the mechanically airfoamed first component is added a second component, which is an aqueous solution of magnesium oxide, dispersants, acrylic resin, perlite and/or precipitated calcium carbonate. A third component is added to these components. The third component is an aqueous solution of aluminum chloride, magnesium sulfate, magnesium chloride, zinc chloride, sulfamic acid, sulfonic acid, citric acid, resorcinol, sodium silicate, zinc oxide, barium metaborate, vinyl alcohol, magnesium carbonate, calcium chloride or vinyl acetate.

In a second, preferred embodiment, the composition may comprise two portions, plus air, in which the initially foamed portion comprises an aqueous solution of polyvinyl acetate and a dispersant, and the second, cementitious portion comprises an aqueous solution or suspension of magnesium oxide and barium metaborate. The foam obtained provides a good insulation "R" value and has properties including flame resistance, low shrinkage, fast set up time, lack of odor and nontoxicity.

BRIEF DESCRIPTION OF THE DRAWINGS

FIG. 2 is a perspective view of the dispensing gun used in the system illustrated in FIG. 1;

FIG. 3 is a perspective view with portions broken away showing a mixing valve used in the gun of FIG. 2, and FIG. 4 is an exploded perspective view with portions broken away showing a spray nozzle used in the gun shown in FIG. 1.

DETAILED DESCRIPTION OF THE INVENTION

Figure 1:
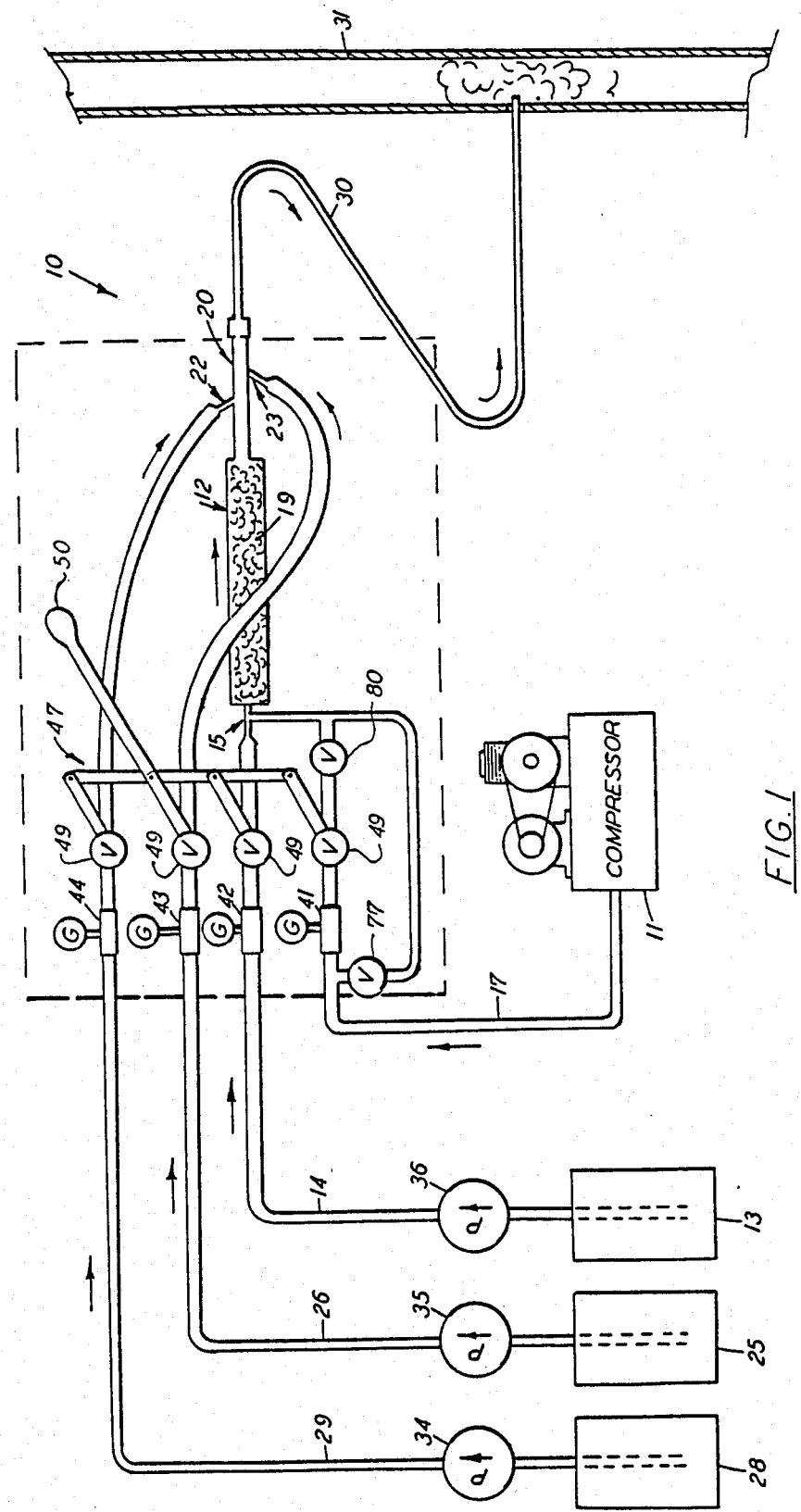
FIG. 1 is a schematic view of a system for introducing into a remote region a four component cementitious insulating foam that embodies the teachings of the present invention.

The present invention relates to a foam and a method for producing a foam material which has utility for insulation. The insulation can be used either in cavities, such as those found between walls, or in open spaces, such as attics. The foam is useful for both new constructions and for existing structures.

The foam can be produced through the combination of three components and air. The first component is an aqueous solution of an alkyl sulfate, a half ester of maleic anhydride and acrylic resin. A sodium salt of a carboxylate polyelectrolyte may be used instead of the alkyl sulfate. Such polyelectrolytes are sold under the Rohm and Haas trademark "Tamol 731", and described in Fordyce et al U.S. Pat. No. 2,930,775. An alkaline aqueous solution has been found to be particularly useful. This component is mechanically foamed by injection of air, for example. After the mechanical foaming a second component is added to the first component. This second component is an aqueous solution of magnesium oxide, dispersants, acrylic resin, perlite and/or precipitated calcium carbonate. The acrylic polymeric resin, such as MC76, serves as a bonding agent for the cementitious composition. After the addition of the second component, a third component is added. This third component is an aqueous solution of at least one of aluminum chloride, magnesium sulfate, magnesium chloride, zinc chloride, sulfamic acid, sulfonic acid, citric acid, resorcinol, sodium silicate, zinc oxide, barium metaborate, vinyl alcohol, magnesium carbonate, calcium chloride and vinyl acetate.

In the first component, the alkyl sulfates may include sodium, ammonium, magnesium, diethanolamine, and/or triethanolamine alkyl sulfates. The sodium and magnesium lauryl sulfates are most preferred. The magnesium lauryl sulfate has been found not to wet plaster board walls upon installation. Styrene maleic anhydride is the preferred half ester of maleic anhydride. These are sold under the registered trademark "SMA" by ARCO Chemical, and discussed in U.S. Pat. Nos. 3,388,106; 3,418,292; 3,178,395; 3,085,986; 3,085,994; 3,342,787; 3,392,155; 3,451,979; 3,245,933; 3,046,246; and 3,245,933. Preferably, the acrylic resin is in the form of a dried powder. The foamed first component provides a support for the cement formed by the second and third components. Thus, any foamable material could be used for the first component, as long as the foam exhibits enough strength and does not collapse before the cementitious portion of the composition obtains sufficient rigidity and integrity to maintain the solid shape of the foam.

For the dispersants of the second component, a sodium salt of a carboxylate polyelectrolyte may advantageously be used. In addition to the "Tamol" dispersants, a dispersant known as "Daxad 30", a Registered Trademark of W. R. Grace & Co., is useful. It is desirable that precipitated calcium carbonate be used in the second component because of its property of fluffiness. However, other forms of calcium carbonate could be used.

Among the ingredients listed for the third component, the most perferred solutions include aluminum chloride, magnesium sulfate, magnesium chloride, zinc chloride or sulfamic acid. One example of a third component would be an aqueous solution including 25 parts of water, 3-6 parts of aluminum chloride and 6-3 parts of magnesium sulfate. It is preferred that the magnesium sulfate be of the synthetic type which has about 17% magnesium present. This magnesium sulfate has been found to contribute to better foam stabilization than Epsom salts. It has also been discovered that zinc oxide and barium metaborate can provide increased hardness and decreased setting time for the foam.

The material formed by this process can be injected into a structure and will hold its form. The foam sets in from 1-10 minutes and has a cure time of approximately 7 days at ambient temperatures. The working time or pot life of the combined first and second components prior to addition of the third component can vary from 1-5 hours. This can be controlled through the use of the polyelectrolyte dispersants. The density of the finished foam is controlled by adjusting the air entrainment in the finished foam. A small variable amount of water remains in the foam, depending upon the relative humidity of the atmosphere in which it is installed.

A basic reaction is believed to involve magnesium oxide and aluminum chloride, magnesium sulfate, magnesium chloride, zinc chloride, sulfamic acid, sodium silicate, zinc oxide, barium metaborate, vinyl alcohol, magnesium carbonate, calcium chloride and/or vinyl acetate. The magnesium oxide is preferably dispersed with dispersants, acrylic resin, perlite and/or precipitated carbonate to form the second component, and an aqueous solution of an alkyl sulfate with a half ester of a maleic anhydride to form the first component, which has been foamed. This combination is then reacted with the aqueous third component which may comprise aluminum chloride, magnesium sulfate, magnesium chloride, zinc chloride, sulfamic acid, sodium silicate, zinc oxide, barium metaborate, vinyl alcohol, magnesium carbonate, calcium chloride and/or vinyl acetate in aqueous solution. It is believed that the alkyl sulfates control the formation and density of foam cell structure. These are reinforced with the acrylic resin and half ester of maleic anhydride. The basic activity is controlled by the size of magnesium oxide particles and by the dispersants.

Extenders may also be included in the first component. The extenders may be selected from precipitated calcium carbonate, feldspar, perlite, microspheres phenolic ballons and zeospheres. Microspheres are micron-sized hollow spheres of sodium silicate.

It is preferred that the final foam composition include 5–75% by weight magnesium oxide. It has been discovered that a 1–5% by weight solution of soap in water can be included with the first component to decrease the water absorption of the final foam. A foam without the soap solution had a water absorption of 15–40% by weight. After the addition of this soap solution, the foam obtained showed a water absorption which was reduced to 1–2% by weight. Ivory brand and Fels Naptha brand soaps have found to be useful.

Successful foams were produced using the following compositions. Percentages are in percent by weight of total material.

EXAMPLE I

First Component
  9% Tamol 731
  3% Acrylic resin
  15% Precipitated calcium carbonate
  10% Water
Second Component
  40% Magnesium oxide
  15% Water
Third Component
  3% Aluminum chloride
  3% Magnesium chloride
  2% Water
  Of course, air, to form the bubbled or cellular foam, is an additional component.

EXAMPLE II

The "Tamol 731" of Example I was replaced by 9% of styrene-maleic anhydride resin.

EXAMPLE III

The "Tamol 731" of Example I was replaced by 2.5% sodium lauryl sulfate and 6.5% water.

Still other Examples show the inventive compositions in actual weights, and in total weight percentages:

EXAMPLE IV

| | First Component (B) | |
|---|---|---|
| 0.25% | Tamol 731 | 0.25 lb. |
| 0.25% | Epsom salts | 0.25 lb. |
| 0.25% | Poly-vinyl acetate | 0.25 lb. |
| 29% | Water | 30.0 lb. |
| | Second Component (A) | |
| 12% | Magnesium oxide | 12.5 lb. |
| 24% | Water | 25.0 lb. |
| 0.25% | Daxad 30 | 0.25 lb. |
| 1.0% | MC 76 acrylic | 1.0 lb. |
| 0.25% | SMA styrene maleic anhydride | 0.25 lb. |

| -continued | | |
|---|---|---|
| 1.0% | Polyvinyl alcohol | 1.0 lb. |
| 0.5% | Tamol 165 | 0.5 lb. |
| | Third Component (C) | |
| 6.7% | Aluminum chloride | 7.0 lb. |
| 5.8% | Epsom salts | 6.0 lb. |
| 19.2% | Water | 20.0 lb. |

Of course, air, to form the bubbled or cellular foam, is an additional component.

EXAMPLE V

In another example, the composition of Example IV uses a modified Third Component (C):

| First Component (B) | | |
|---|---|---|
| 0.25% | Tamol 731 | 0.25 lb. |
| 0.25% | Epsom salts | 0.25 lb. |
| 0.25% | Poly-vinyl acetate | 0.25 lb. |
| 29% | Water | 30.0 lb. |
| Second Component (A) | | |
| 12.3% | Magnesium oxide | 12.5 lb. |
| 25.5% | Water | 25.0 lb. |
| 0.25% | Daxad 30 | 0.25 lb. |
| 1.0% | MC 76 acrylic | 1.0 lb. |
| 0.25% | SMA styrene maleic anhydride | 0.25 lb. |
| 1.0% | Polyvinyl alcohol | 1.0 lb. |
| 0.5% | Tamol 165 | 0.5 lb. |
| Third Component (C) | | |
| 3.0% | Aluminum chloride | 3.0 lb. |
| 4.0% | Polyvinyl alcohol | 4.0 lb. |
| 19.5% | Water | 20.0 lb. |

Additionally, certain compositions which are even simpler, and can be formed from only two separate portions, are now known to perform quite satisfactorily, as indicated in Example VI below:

EXAMPLE VI

| First Component (B) | |
|---|---|
| Polyvinyl acetate (8%) | about 15.5–21.2% or about 6–25 lb. |
| Tamol, spray dried | about 0.3–1.7% or about 0.12–2.0 lb. |
| Water | about 38.8–33.9% or about 15–40 lb. |
| Second Component (A) | |
| Magnesium oxide | about 7.7–15.3% or about 3–18 lb. |
| Busan | about 0.6–1.7% or about 0.2–2.0 lb. |
| Water | about 36.2–25.4% or about 14–30 lb. |
| Daxad 30 | about 0.6–0.9% or about 0.25–1 lb. |

Air, to form the bubbled or cellular foam, initially with the first Component (B), is an additional component. In this preferred composition it is believed that the mixture of polyvinyl alcohol from the first Component (B) and the Busan from the second Component (A) quickly react to cause setting of the foam matrix to provide quickly a foam of excellent integrity to support cement until it hardens in place thus contributing its own even more permanent integrity to the insulative foam product. Busan TM is a barium metaborate composition available from Buckman Laboratories. Either 4 mol or 8 mol metaborate may be used. In this preferred composition it is believed that the mixture of polyvinyl alcohol from first component (B), and the Busan from second component (A) quickly react to form a cellular foam, with or without the presence of magnesium oxide. When present, magnesium oxide, contributes long term integrity and fire resistance to the foam.

EXAMPLE VII

In still another method of preparing a cellular foam, the known quick reaction between calcium chloride and sodium silicate is utilized in a new application. The following formula provides an insulating foam structure:

| First Component | |
|---|---|
| Calcium Chloride | about 3.5–8.4% or about 1–5 lb. |
| Water | about 53.4–33.6 or about 15–20 lb. |
| Second Component | |
| Sodium Silicate | about 7.1–13.5% or about 2–13.5 lb. |
| Water | about 35.5–42.1% or about 10–25 lb. |
| Fluorad FC100 | about 0.3–2.6% or about 0.1–1.5 lb. |

Fluorad is a Registered Trademark of Minnesota Mining and Manufacturing Co., and is a fluorinated alkyl amphoteric mixture surfactant. Daxad 21, a Registered Trademark of W. R. Grace & Co. may also be used. Daxad 21 is a mono-calcium salt of polymerized aryl alkyl sulfonic acids.

The foam formation technique described in Example VI may also be used with this Example VII composition.

Further, addition of mica (muscovite) to the First Component contributes to the reaction of the calcium chloride with the sodium silicate and improves the water resistance of the resultant foam. Addition of polyvinyl alcohol to the First Component contributes to the expandability and integrity of the foam.

Weight ratios of sodium silicate ($SiO_2/NaO_2$) in the range of about 3.2 to 42.2°Be has been found satisfactory.

Although the exact reaction mechanism of the inventive two portion foam insulation system is not yet fully understood, it is believed that the chemistry which occurs during laminar flow mixing contributes to the desirable results of the present invention. As previously indicated, the idea of having a foam system with sufficient integrity to support cement until the cement can cure is carried out in the composition of Example VI by the very fast reaction between the polyvinyl alcohol in the First Component (B) which is foamed, and the Busan, barium metaborate, in the cement containing Second Component (A). In the other exemplary compositions the third portion contains aluminum chloride and Epsom salts, both of which are hardeners for cement, and which contribute to fast hardening of the cement portion of the composition. However, the aluminum chloride also may quickly, but partially, react with the Tamol to form an initial gel. Tamol 165 is an ammonium salt of polymeric carboxylic acid, and Tamol 731 SD is a sodium salt carboxylate polyelectrolyte, both available from Rohm & Haas Co.

Additionally, there is a possible chemical reaction between the Tamol and Epsom salts to form a magnesium salt which exhibits better properties for foaming than Tamol alone. Polyvinyl acetate, spray dried, as an additive, is possibly catalytic to this reaction which further improves the properties of the foams.

With reference to the drawings and, in particular, to FIG. 1, there is shown a foaming gun system 10 for manufacturing and dispensing a four component insulating foam. One of the components used to generate the foam is compressed air provided by a conventional air compressor 11. The air is combined wth a foaming agent (first component) in a foaming or expansion chamber 12. The foaming agent is stored in container 13 and delivered by line 14 to a mixing valve 15 located at the entrance to the foaming chamber. As will be explained in greater detail below, compressed air is also delivered to the valve 15 via line 17 wherein the two materials are brought together in metered amounts to create a latherlike substance containing a multitude of air bubbles. To assist in the generation of the bubbles, the foaming or expansion chamber 12 is packed with a finely divided material 19, such as fine steel wool or glass beads, which creates sufficient turbulence in the flow stream to ensure that the material is well aerated.

The foaming chamber 12 is connected directly in series with a second coating or mixing chamber 20 whereupon the flow of foam that is generated in the foaming chamber is caused to flow directly into and through the second chamber. Although not shown, a foam penetratable seal is located at the entrance to the coating or mixing chamber 20 which prevents the packing material 19 from passing between chambers.

A pair of inlet ports 22 and 23 are mounted in the side wall of the coating or mixing chamber 20 to permit further materials to be added to the foam flow. One of these two coating materials is a cementitious substance (second component) used for preparing a fast setting insulation. The cementitious material is stored in the form of an aqueous solution in container 25 and is brought to inlet port 23 via supply line 26. A fast setting material of this type that is suitable for use in the present system is magnesium oxide. The second coating material (third component), which is stored in container 28, is an agent that is capable of reacting with the cementitious material to produce rapid hardening of the foam. The material, upon hardening, also exhibits early strength so that it will become self-supporting almost immediately upon being injected into a cavity. A hose 30 is connected to the outlet of the coating or mixing chamber 20 through which the foam is dispensed into a wall cavity 31 or any other suitable region that is to be insulated. The hose and the coating or mixing chamber 20 combine to provide a relatively long flow path wherein the coating ingredients combine or mix with the foam under laminar flow conditions to create a well defined homogeneous mixture.

In the embodiment of the invention shown in FIG. 1, the reacting agent is the first material introduced into the mixing chamber at inlet port 22. The cementitious material is then introduced into the chamber at the second inlet port 23. It is important for the proper manufacture of the present insulation to space the two inlet ports far enough apart to allow sufficient time for the first introduced material to become uniformly distributed in the foam before the second material is added. Although the exact mechanism by which the two coating materials combine is not fully understood, it is known that if they are added simultaneously or too close together, the material will not react in a predictable manner to produce optimum foam. The order in which the two coating materials are added to the mix is immaterial, but it is perferable to add the magnesium oxide (second) component to the foam before the third component. What is important, however, is it is believed that the first introduced material must have sufficient time to substantially coat all of the bubbles in the foam before the second is added. As a result, the cementitious material, upon reacting with the agent, is able to create a hard shell about each bubble to trap or encapsulate the air within the foam blanket. It is believed that by bringing the two coating materials into the system at about the same time causes the bubbles to collapse before encapsulation leading to a failure in the manufacturing process.

The foaming agent and the two coating materials are each drawn from their respective containers by means of independent pumps 34–36 that are operatively connected into appropriate delivery lines. The materials are pumped at relatively high pressure to the gun section 40 of the system which is illustrated in greater detail in FIG. 2. The high pressure flow in each line, as well as the high pressure flow of air carried by line 17, is stepped down before entering the gun by means of small pressure regulators 41–44. The regulators are individually set so that the pressure of the fluid traveling in each line is brought to an optimum value before the fluid is delivered to the gun. The gun is furnished with a trigger mechanism, generally referenced 47, that enables the operator to quickly actuate or shut down the gun. The trigger includes four on-off valves 49—49 of similar design which are positioned in each supply line downstream from the pressure regulators. Each on-off valve is connected to the trigger 50 through a quick acting lever mechanism 51.

The foaming agent moving through line 14 is passed into the central opening 53 contained in the previously noted mixing valve 15 (FIG. 3). The opening terminates at a metering orifice 54 whereby a metered amount of the foaming agent enters the foaming chamber. Air from line 17 is also brought into the mixing valve directly behind a control ring 55. The ring, in turn, has a series of equally spaced nozzle passages 56—56 formed therein which both turn and shape the air stream entering the foaming chamber. The passages are contoured to impart a volute-like motion to the air stream which enhances bubble generation and provides for thorough mixing at the entrance to the chamber. Bubble generation is further enhanced as the mixture moves through the packing material.

As previously noted, the two coating materials are brought into the flow further downstream in the coating or mixing chamber 20. Inlet port 22 is housed within a Y-connector 57 while inlet port 23 is similarly housed within T-connector 58. To insure that each of the two materials thoroughly coat the bubbles, they are sprayed into the foam in the form of a fine mist. A spray nozzle 60, as illustrated in FIG. 4, is used for this purpose. The nozzle is contained in the neck section of the connector and is positioned to direct the mist into the foam without disturbing the laminar nature of the flow. Each spray nozzle 60 includes a body section 62 that is slidably received in the associated connector. The end wall 63 of the body section contains a fine hole 64 that is designed to bring the material passing therethrough into a well defined spray pattern. The inside of the body section is bored out and th bored passage 65 threaded to receive a threaded collar 68 radially disposed on control head 67. The head has a series of entrance slots 69—69 formed therein which meter material inot the nozzle.

After entering the nozzle, the material is caused to pass through a series of contoured vanes 70—70 that whirls the material as it passes through the hole 64. This, in turn, imparts a circular motion to the mist entering the chamber providing for a more uniform and homogeneous coating of the bubbles in the flow stream. The foam material then enters hose 30 and is ultimately dispensed into the insulating region. The materials continue to mix or blend under laminar conditions in the hose, which actually is an extension of the coating chamber. The hose therefore should be between six and ten feet long to enable the blending process to proceed to near completion. Shut off valves 72 and 73 are provided at the inlet ports which are used by the operator to check the condition of the supply line and the performance of the gun.

An air bypass circuit, generally referenced 75, is mounted upon the gun which allows the operator to reroute air only into the gun for the purpose of cleaning the two chambers and the hose. The bypass loop includes a line 76 and a manually operated bypass valve 77 which takes air from the air line 17 and brings it around the trigger directly into the foaming chamber. A second shutoff valve 80 is positioned in the air line 17 directly at the entrance to the mixing valve which isolates the bypass system from the trigger mechanism. To clean the gun, the shutoff valve 80 is closed and the bypass valve 77 is opened permitting compressed air to bypass the trigger mechanism and thus purge the gun without having to disconnect the material pumps.

Using this foam gun, the first component is foamed through a mixing chamber with air to produce a foam having the consistency of shaving cream. Next, one of the coating materials is introduced into the thus-formed foam cells as the foam is passed to the coating chamber. After this, the other coating material is introduced into the formed-foam structure and the combined ingredients are forced out of the mixing chamber with air pressure through the hose and into an existing cavity for setting and curing.

It is preferred that each component is introduced to the gun through an equal number of orifices. The ratio of the ranges of the orifice sizes for the first, second and third components is about 2-2.5 to about 1-1.5 to about 1-1.5, respectively. Since the flow rate is proportional to the cross-sectional area of the orifices (assuming equal pressure), this results in a ratio of flow rate ranges of about 1-1.56 to about 0.25-0.56 to about 0.25-0.56, respectively.

The acrylic resin in the first and second components is believed to enhance foamability. The perlite and/or calcium carbonate of the first component is used for extending the foam. Thus, although these elements are desirable, they are not believed to be essential in obtaining a useable foam.

A second method for preparing the foam of the present invention may be performed in which a conventional foam gun may be used. Magnesium oxide is mixed with alkyl sulfates, dispersants, bentonite clay and perlite in an aqueous slurry-solution. A pre-foam is formed in an appropriate mixer using from 1-5% of alkyl sulfate and 3-9% of aluminum chloride and/or magnesium sulfate in an aqueous solution. The other ingredients described for the third component in the method described above could also be used. From 2-80% of the pre-foamed alkyl sulfate is incorporated and mixed with the magnesium oxide slurry for about 1 minute. The resulting foamed cell structure will set and cure into useable insulation foam. The density of the cell formation is controlled by the amount of alkyl sulfate mixture incorporated into the magnesium oxide slurry. These two components may also be mixed and foamed in a one step operation using the expansion chamber of a foaming gun. The cell structure obtained by this process does not appear to exhibit maximum cell formation and density, while the existing equipment cell formation is suppressed.

What is claimed is:

1. A process for producing insulating foam, comprising:
    (a) mechanically foaming with air a foamable first component comprising an alkyl sulfate and a half ester of maleic anhydride;
    (b) adding to said foamed first component a second component comprising an aqueous solution of magnesium oxide at least one of perlite and calcium carbonate, and a dispersant; and
    (c) adding to said first component a third component comprising an aqueous solution of at least one of aluminum chloride, magnesium sulfate, magnesium chloride, zinc chloride, sulfamic acid, sulfonic acid, citric acid, resorcinol, sodium silicate, zinc oxide, barium metaborate, vinyl alcohol, magnesium carbonate, calium chloride and vinyl acetate.

2. A process as claimed in claim 1, wherein said calcium carbonate is precipitated calcium carbonate.

3. A process as claimed in claim 1, wherein said first and second components each further comprise acrylic resin.

4. A process as claimed in claim 6, wherein said half ester of maleic anhydride is styrene maleic anhydride.

5. A process as claimed in claim 1, wherein said first component further comprises at least one extender selected from precipitated calcium carbonate, feldspar, perlite, microspheres, phenolic ballons and zeospheres.

6. A process as claimed in claim 1, wherein said alkyl sulfate is at least one of sodium, ammonium, magnesium, diethanolamine, and triethanolamine alkyl sulfate.

7. A process as claimed in claim 6, wherein said alkyl sulfate is sodium or magnesium lauryl sulfate.

8. A process as claimed in claim 3, wherein said third component comprises an aqueous solution of at least one of aluminum chloride, magnesium sulfate, magnesium chloride, zinc chloride and sulfamic acid.

9. A process as claimed in claim 8, wherein said third component comprises an aqueous solution of at least one of aluminum chloride, zinc chloride and sulfamic acid.

10. A process as claimed in claim 3, wherein the dispersant of said second component is a sodium salt of a carboxylated polyelectrolyte.

11. A process as claimed in claim 1, wherein said first, second and third components are flowed and the flow rate ranges ratio of said first, second and third components is from about 1-1.56 to about 0.25-0.56 to about 0.25-0.56, respectively.

12. A process as claimed in claim 3, wherein said first component further comprises a 1-5% by weight aqueous solution of soap.

13. A process for producing thermally insulating foam, comprising:
    (a) mechanically foaming with air a foamable first component comprising an aqueous solution of polyvinyl alcohol and a dispersant; and (b) adding to said first component a second component comprising an aqueous solution of barium metaborate.

14. The process of claim 13, wherein the second component additionally comprises an aqueous solution of magnesium oxide.

15. The process as claimed in claim 1, wherein the dispersant in said first component comprises a sodium salt carboxylate electrolyte.

16. A process as claimed in claim 1, wherein said first, second and third components are flowed and the flow rate ranges ratio of said first and second components is from about 1–1.56 to about 0.25–0.56, respectively.

17. A process as claimed in any of claims 1, 2 or 3, wherein said first component is foamed through a foaming chamber, said second component is introduced into the formed foam cells in a mixing chamber, and any third component is thereafter introduced into the formed foam cells.

18. A process as claimed in claim 15, further comprising subsequently forcing the mixture of components out of said mixing chamber and into a cavity of a structure for setting and curing.

19. A process as claimed in claim 15, wherein said components are each introduced through an equal number of orifices, the ratio of the diameters of said orifices for said first, second and third components being about 2–2.5 to about 1–1.5 to about 1–1.5, respectively.

20. A process as claimed in claim 15, wherein said second and third components are sprayed into said coating chamber.

21. The process of claim 3, wherein said first component is an aqueous alkaline solution.

22. A process for producing insulating foam, comprising:
    mixing magnesium oxide, alkyl sulfate, dispersant, bentonite clay and perlite in an aqueous slurry solution;
    forming a pre-foam using about 1–5% by weight alkyl sulfate and about 3–9% by weight of at least one of magnesium sulfate and aluminum chloride in an aqueous solution;
    incorporating the pre-foam into the magnesium oxide slurry and mixing.

23. The process of claim 22, wherein said magnesium oxide slurry and said pre-foam are mixed and foamed in one step through the expansion chamber of a foaming gun.

24. The process of claim 1, wherein said second component is added before said third component.

25. The process of claim 1, wherein said third component is added before said second component.

26. A thermal insulation foam produced by the process of claim 1.

27. A thermal insulation foam produced by the process of claim 13.

* * * * *